Dec. 29, 1964 HACHIRO YAMASHITA 3,163,402
APPARATUS FOR SUBSTANTIALLY INSTANTLY MIXING
AND KNEADING VARIOUS MATERIALS
Filed March 27, 1959

INVENTOR.
Hachiro Yamashita
BY
Michael S Striker
attorney

United States Patent Office 3,163,402
Patented Dec. 29, 1964

3,163,402
APPARATUS FOR SUBSTANTIALLY INSTANT-
LY MIXING AND KNEADING VARIOUS
MATERIALS
Hachiro Yamashita, 108 3-chome, Kitaurawamachi,
Urawa, Japan
Filed Mar. 27, 1959, Ser. No. 802,452
Claims priority, application Japan, Mar. 31, 1958,
33/8,496
6 Claims. (Cl. 259—6)

This invention relates to a system of substantially instantly mixing and kneading various materials, and particularly to a machine adapted to carry out the pertaining operations.

It is the main object of the invention to provide an apparatus adapted to mix and knead various kinds of materials, of which, for instance, one may be powder or liquid, continuously, but in a comparatively shorter period of time than up to now possible.

It is another object of the invention to provide an apparatus adapted to carry out the above mentioned kind of mixing and kneading in an ideal manner, namely so that the products have an even composition as a whole, local variations in the mixture being reduced to a minimum.

It is a further object of the invention to provide a rather compact means to accomplish the above mentioned objects, which nevertheless operates with increased efficiency with respect to power requirement as well as to maintenance.

It is a still further object of the invention to provide a novel mixing and kneading means adapted for a variety of treating materials, substantially without any limitation due to the nature, viscosity and similar characteristics of the materials to be treated.

Various further and more specific objects, features and advantages of the invention will appear from the description given below, taken in connection with the accompanying drawings, illustrating by way of example several preferred embodiments of this invention:

Figure 1:
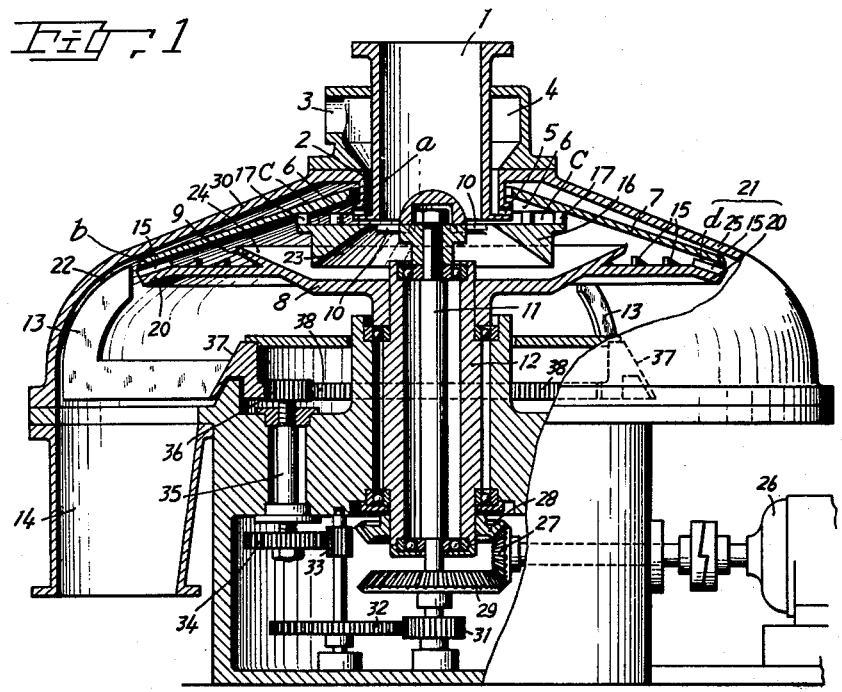
FIG. 1 is a side elevation, partially in axial section, of a machine adapted to operate according to this invention.

Now, referring to the drawing, preferred embodiments of this invention will be described hereinafter more in detail. In the present machine, a plurality of radially arranged short bars 10 is fixedly mounted on the boss provided on the upper end portion of a vertical spindle 11 so as to connect radially said bars with a first annular disc 16, thereby causing rotation of the latter in unison with said boss, when the spindle rotates. The disc or ring 16 is provided at its centre with a cone-shaped opening, while along the peripheral margin of the former a number of small supporting pins 17 is fixed thereon so as to be spaced from one another, and a cone-shaped ring 7 is fixedly mounted on said pins 17, thereby forming a small circular gap c between disc 16 and ring 7 for passage of the material to be treated. Thus, the cone-shaped ring 7 is also rotated upon rotation of spindle 11. A hollow shaft 12 is arranged concentrically with the spindle 11, a dished disc 8 being fixedly mounted on the shaft 12, which is rotatably supported by a plurality of anti-friction bearings on said spindle 11. The second disc 8 is provided in a proper intermediate area thereof with a cone-shaped projection 9, while along its periphery the said disc 8 is formed with a downwardly directed flange 20, on which are formed kneading means, such as a plurality of vane-like members 15 extending in a horizontal plane at an acute angle relative to the tangent of the periphery at the particular point, as clearly seen especially from FIGURE 2. These members 15 may, however, be replaced by elastic pressure means as explained more fully hereinafter. In the case of the example of FIGS. 2 and 3, the members 15 are located in the neighborhood of the margin along the outer edge 25 of cone-ring 7 with a narrow spacing $d$ therebetween, while in the alternative case the elastic pressure means are kept in contact with the margin along said edge 25. In this manner, the members 15, 20 and 25 constitute in combination a kind of kneading mechanism 21. An electric motor 26 drives through a coupling a bevel pinion 27, which meshes with a bevel gear 28 attached to the hollow shaft 12, thus driving the second disc 8 in a certain direction, while the said pinion 27 meshes also with a further bevel gear 29, which is fixedly mounted on spindle 11, thus driving the first disc 16 as well as the cone-ring 7 in opposite direction. If necessary, a further gear may be arranged between pinion 27 and gear 28 or 29, so that rotation of all of said rotatable members may be effected in one and the same direction. The rotational speeds are selected so as to suit the types and natures of the materials to be mixed and kneaded together, as well as the type and nature of the products intended to be obtained. One of the materials is introduced into a supply inlet 1 provided at the upper centre of the machine, while the other material is fed through a side inlet 3 arranged at one side of said inlet 1 and at a proper distance therefrom whence the latter material is transmitted through a reservoir chamber 4 and a series of supply passages 2, 5 and 6. Scraper means 13 serve to scrape the mixture off the inner surface of the machine casing, and thus the scraped material is discharged from the inner machine space through an outlet opening 14 to the outside.

The first material such as any suitable powder fed through supply inlet 1 passes under gravity action through a plurality of opening formed between individual pairs of neighboring connecting bars 10 carrying the first disc 16, on to the rotating second disc 8. Under the influence of centrifugal force, the material is thrown radially in an even thin layer over the top surface of disc 8 and against the inner wall surface of cone-ring 7 to which thus the aforementioned centrifugal distribution of said material is applied. The second material, for instance any viscous material, fed from the second material supply inlet 3, through a reservoir space 4, a series of passages 2, 5, 6, and a number of parallel openings or gaps $c$ on to the inner wall surface of cone-ring 7 is also spread radially in an even thin layer over this last mentioned surface. In this way, there are produced two layers of different materials on the inside wall of cone-ring 7 in an overlapped manner, after collision with each other. The speed of the latter ring is preferably selected by taking into account the adhesive nature or viscosity of the viscous material so as to produce the thinest layer possible of the latter on the inner wall surface of the ring. Both kinds of materials to be mixed together and thus centrifugally distributed on the last mentioned ring are subjected to the already mentioned mixing action by the kneading mechanism 21 formed on the marginal portion of ring 8. The thus kneaded materials are thrown in unison in outward or radial direction under the influence of centrifugal force against the inner wall surface of the cover casing 30 of the machine. The intimately mixed materials are scraped off the latter by said scraper means 13 and then discharged through discharge opening 14, as already described.

Figure 2:
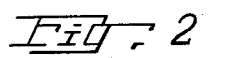
FIG. 2 is an enlarged plan view of part of one of the two rotors employed therein.
Figure 2:
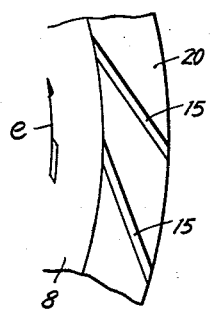
Figure 3:
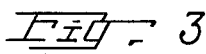
FIG. 3 is an enlarged sectional view, illustrating a kneading mechanism to be employed in the machine.
Figure 3:
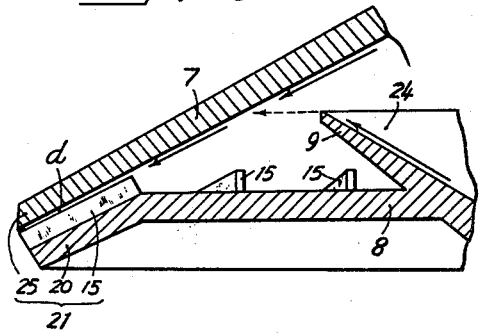
Figure 4:
FIG. 4 is a sectional view corresponding to FIG. 3 and illustrating a somewhat modified kneading mechanism.
Figure 4:
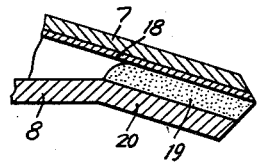

Two embodiments of the kneading mechanisms are shown in FIGS. 2 and 3 and 4, respectively. The first embodiment shown in FIGS. 2 and 3 includes a plurality of vane-like members or projecting edges 15 fixedly attached to the upper surface of the rim 20 of the disc 8 for the purpose of kneading the materials to be mixed together, as in the case of the arrangement shown in FIGURE 1. In this case, each of the projecting edges is arranged to form an acute angle with the rotational direction $e$ or with the tangent of the periphery of the particular point of the disc 8, which revolves in operation at a rate equal to that of the ring 7 for the purpose of scraping the adhered viscous mixed materials off the respective surfaces, as well as of attaining the desired full kneading effect. However, in the second embodiment shown in FIG. 4 the kneading effect is attained by co-operation between an elastic lining layer 18, preferably made of rubber and attached to the inner wall surface of cone-ring 7, and the soft elastic layer 19 provided on the rim 20 of the dished disc 8 and kept in slight pressure contact with the layer 18. The desired kneading effect is carried into effect in this case by the pressure contact between said two elastic layers in co-operation with the two rotating members 7 and 8.

More specifically explaining the passage of the materials through the machine, the second material, for instance any viscous material supplied to the laterally arranged second supply inlet 3, is fed preferably under pressure, the material is thence transmitted, as already explained, through reservoir space formed around the vertically arranged inlet 1, the connecting passage 2 and the discharge openings 5 to the radially extending reservoir passage 6 formed between the lower wall surface of cone-ring 7 and the upper wall surface of disc 16 having a triangular cross-section. The thus transmitted second material is then spread along the lower wall surface of ring 7, as already described. In this arrangement, the centrifugal force produced at any point on the lower wall surface of ring 7 is naturally depending on the peripheral speed thereof, or in other words, on the radius to such point. Thus, the force is at a minimum at the inner edge $a$ thereof, so that if the viscous material were to be fed directly to this inlet edge the desired centrifugal distribution thereof would not always be readily obtainable on account of the tendency of the material to adhere to the wall surface of ring 7. In the present machine, however, the second material is introduced into said reservoir passage 6 and kept reserved therein temporarily, so that thereby a more or less accumulated mass is produced therein, which is more likely to be subject to the centrifugal action, and the resulting centrifugal force thereof will surmount the adhesion of the treated material, thus providing a smooth and efficient centrifugal distribution thereof. In this way, the desired formation of a uniform and even film layer of the material can be realized, even when the material is of rather high viscosity.

The kneaded materials thoroughly mixed together by means of the kneading mechanism 21 are thrown outwardly against the inner wall surface 22 of cover casing 30. Without provision of any scraper means, the thus adhering mixture would by itself pass downwards along the wall surface to the discharge opening 14. However, the discharge effect may be insufficient on account of the viscosity and adhesion of the mixture. Thus, in the present machine, one or more scraper blades 13 are arranged substantially in engagement with the inner wall surface 22 and adapted to be rotated at a proper speed for the purpose of scraping the mixture off the wall. For this purpose, a gear 31 is fixedly mounted on the rotatable shaft 11. Rotation is transmitted from said gear 31 through a gear train 32, 33 and 34, to a vertaical shaft 35, which carries the gears 34 and 36 at its opposite ends, respectively, and rotates at a reduced velocity. The last mentioned gear 36 engages the internal gear 38 provided on the scraper assembly 37 and thus rotates the scraper blade or blades 13. In this way, even when a highly viscous mixture is produced, it can be easily discharged.

When one or both of the materials to be mixed together are viscous, the rotational speeds of rotatable disc 8 and cone-ring 7 are preferably selected to correspond to the viscosity of the material to be treated. In other words, the material is during its treatment centrifugally distributed into a thin film, as already mentioned, and especially during being thrown out from the free edge of the cone-shaped projection 9 it is subjected to shearing action, thus flying against cone-ring 7 in finely divided or pulverized form. Thus, the speed of the driving electric motor 26 is made adjustable in well known manner, so that the speeds of ring 7 and disc 8 may be varied as desired. As an instance, for a highly viscous liquid, having a viscosity of the order of 20,000 centipoises, such as viscous paint or synthetic resin adhesives, the machine advantageously operates, with the rotor having a radius of 400 millimeters, at a rotational speed of 6000 r.p.m., the thickness of the resulting film amounting to .1 millimeter or less, and efficient kneading effect can be instantly attained in spite of the higher viscosity of the material under treatment. As a second instance, with a grease having a viscosity of the order of 8000 centipoises, the machine with a rotor of a radius 300 millimeters preferably operates at a speed of the order of 3000 r.p.m., thus producing therein a thin film having a thickness of .1 millimeter. As a third instance, taking a castor oil having a viscosity of 700 centipoises, the machine provided with a rotor of radius 400 millimeters rotates advantageously at a speed of 1800 r.p.m., thus forming therein a film of thickness .08 millimeter, while under the same mechanical conditions water will produce a film of .03 millimeter.

Although several preferred embodiments of the invention have been illustrated in the accompanying drawing and described in the foregoing specification, it is to be expressly understood that the invention is not limited thereto. Modifications may occur to those skilled in the art, as will be apparent relative to such as those in the specific arrangements, shapes and sizes of the parts illustrated, and may be made without departing from the spirit, scope and objects of the invention.

Thus, when it is desired simply to mix together two kinds of materials, a machine substantially comprising the dished disc 8 as its first rotating member or rotor, and the cone-shaped member 7 as its second rotating member or rotor, will function for the purpose. In this case, the materials to be treated are separately introduced to the two rotating members arranged opposite each other, respectively, thus forming thereon separate layers of the materials under consideration, and then the resulting layers are directed in crossing streams to collide with each other. Although in the embodiments herein disclosed, both rotating members are of different radii, the invention should not be limited thereto. On the other hand, two rotating members hereinbefore explained are formed in dished-, cup-, or cone-shape. However, plain discs will function equally for the purpose. While in the preceding embodiments, means to guide the two material layers in crossing streams are provided on one or both of the rotating members, the invention should not be limited thereto. Any suitable means, such as compressed air, gas or pressure liquid, may be employed for the purpose. Materials to be treated should not also be limited to two. Three or more kinds of materials could be equally treated, for instance, by providing one or more further rotating members. The direction of rotation of one of said rotating members may be, if necessary, selected in opposite relation to other rotating member or members, as already referred to.

What is claimed and desired to be secured by Letters Patent is:

1. In a mixer, in combination, a rotary dished member having an outer peripheral portion forming, substantially, part of a cone, said dished member being adapted to receive a first material; a rotary ring coaxial with said dished member having an annular face directed away from said dished member, the interior of said dished member being directed toward said ring, and the annular face of said ring being adapted to receive a second material; an annular frusto-conical member coaxial with and surrounding said ring and having an inner face directed toward said dished member, said annular frusto-conical member being inclined oppositely to said peripheral portion of said dished member while being spaced therefrom and extending through a substantial distance beyond the same; and means connecting said frusto-conical member to said ring for rotary movement therewith while placing said inner face of said frusto-conical member in communication with said annular face of said ring, whereby during rotation of said ring and members about their common axis said second material on said annular face of said ring will fly therefrom by centrifugal force onto said inner face of said frusto-conical member and move along said inner face outwardly beyond the periphery of said dished member, while said first material received by said dished member will move by centrifugal force from the periphery thereof onto the inner face of said frusto-conical member to mix with the second material while both materials simultaneously move along the portion of said frusto-conical member which extends beyond said dished member toward the outer periphery of said frusto-conical member by centrifugal force.

2. In a mixer, in combination, a rotary dished member having an outer peripheral portion forming, substantially, part of a cone; a rotary ring coaxial with said dished member, the interior of said dished member being directed toward said ring and said ring having an annular face directed away from said dished member; feeding means having an inner portion communicating through said ring with said dished member and a separate outer portion out of communication with said inner portion and communicating with said annular face of said ring, so that a pair of materials to be mixed may be fed through said portions of said feeding means respectively to the interior of said dished member and to said annular face of said ring without contacting each other; an annular frusto-conical member coaxial with and surrounding said ring and having an inner face directed toward said dished member, said annular frusto-conical member being inclined oppositely to said peripheral portion of said dished member while being spaced therefrom and extending through a substantial distance beyond the same; and means connecting said frusto-conical member to said ring for rotary movement therewith while placing said inner face of said frusto-conical member in communication with said annular face of said ring, whereby during rotation of said ring and members about their common axis a first material on said annular face of said ring will fly therefrom by centrifugal force onto said inner face of said frusto-conical member and move along said inner face outwardly beyond the periphery of said dished member, while a second material fed by said inner portion of said feeding means to said dished member will move by centrifugal force from the periphery thereof onto the inner face of said frusto-conical member to mix with the first material while both materials simultaneously move along the portion of said frusto-conical member which extends beyond said dished member toward the outer periphery of said frusto-conical member by centrifugal force.

3. In a mixer, in combination, a rotary dished member having an outer peripheral portion forming, substantially, part of a cone; a rotary ring coaxial with said dished member, the interior of said dished member being directed toward said ring and said ring having an annular face directed away from said dished member; feeding means having an inner portion communicating through said ring with said dished member and a separate outer portion out of communication with said inner portion and communicating with said annular face of said ring, so that a pair of materials to be mixed may be fed through said portions of said feeding means respectively to the interior of said dished member and to said annular face of said ring without contacting each other; an annular frusto-conical member coaxial with and surrounding said ring and having an inner face directed toward said dished member, said annular frusto-conical member being inclined oppositely to said peripheral portion of said dished member while being spaced therefrom and extending through a substantial distance beyond the same; means connecting said frusto-conical member to said ring for rotary movement therewith while placing said inner face of said frusto-conical member in communication with said annular face of said ring, whereby during rotation of said ring and members about their common axis a first material on said annular face of said ring will fly therefrom by centrifugal force onto said inner face of said frusto-conical member and move along said inner face outwardly beyond the periphery of said dished member, while a second material fed by said inner portion of said feeding means to said dished member will move by centrifugal force from the periphery thereof onto the inner face of said frusto-conical member to mix with the first material while both materials simultaneously move along the portion of said frusto-conical member which extends beyond said dished member toward the outer periphery of said frusto-conical member by centrifugal force; and means for mechanically mixing said mixture of the first and second materials while both materials move along the portion of said frusto-conical member which extends beyond said dished member toward the outer periphery of said frusto-conical member.

4. In a mixer, in combination, a rotary dished member having an outer peripheral portion forming, substantially, part of a cone; a rotary ring coaxial with said dished member, the interior of said dished member being directed toward said ring and said ring having an annular face directed away from said dished member; feeding means having an inner portion communicating through said ring with said dished member and a separate outer portion out of communication with said inner portion and communicating with said annular face of said ring, so that a pair of materials to be mixed may be fed through said portions of said feeding means respectively to the interior of said dished member and to said annular face of said ring without contacting each other; an annular frusto-conical member coaxial with and surrounding said ring and having an inner face directed toward said dished member, said annular frusto-conical member being inclined oppositely to said peripheral portion of said dished member while being spaced therefrom and extending through a substantial distance beyond the same; means connecting said frusto-conical member to said ring for rotary movement therewith while placing said inner face of said frusto-conical member in communication with said annular face of said ring, whereby during rotation of said ring and members about their common axis a first material on said annular face of said ring will fly therefrom by centrifugal force onto said inner face of said frusto-conical member and move along said inner face outwardly beyond the periphery of said dished member, while a second material fed by said inner portion of said feeding means to said dished member will move by centrifugal force from the periphery thereof onto the inner face of said frusto-conical member to mix with the first material while both materials simultaneously move along the portion of said frusto-conical member which extends beyond said dished member toward the outer periphery of said frusto-conical member by centrifugal force; means for mechanically mixing said mixture of the first and second materials while both materials move along the portion of said frusto-conical member which extends beyond said dished member toward the outer periphery of said frusto-conical member; and housing means encompassing said ring and dished member.

5. In a mixer, in combination, a rotary dished member having an outer peripheral portion forming, substantially, part of a cone; a rotary ring coaxial with said dished member, the interior of said dished member being directed toward said ring and said ring having an annular face directed away from said dished member; feeding means having an inner portion communicating through said ring with said dished member and a separate outer portion out of communication with said inner portion and communicating with said annular face of said ring, so that a pair of materials to be mixed may be fed through said portions of said feeding means respectively to the interior of said dished member and to said annular face of said ring without contacting each other; an annular frusto-conical member coaxial with and surrounding said ring and having an inner face directed toward said dished member, said annular frusto-conical member being inclined oppositely to said peripheral portion of said dished member while being spaced therefrom and extending through a substantial distance beyond the same; means connecting said frusto-conical member to said ring for rotary movement therewith while placing said inner face of said frusto-conical member in communication with said annular face of said ring, whereby during rotation of said ring and members about their common axis a first material on said annular face of said ring will fly therefrom by centrifugal force onto said inner face of said frusto-conical member and move along said inner face outwardly beyond the periphery of said dished member, while a second material fed by said inner portion of said feeding means to said dished member will move by centrifugal force from the periphery thereof onto the inner face of said frusto-conical member to mix with the first material while both materials simultaneously move along the portion of said frusto-conical member which extends beyond said dished member toward the outer periphery of said frusto-conical member by centrifugal force; means for mechanically mixing said mixture of the first and second materials while both materials move along the portion of said frusto-conical member which extends beyond said dished member toward the outer periphery of said frusto-conical member; housing means encompassing said ring and dished member; and means for removing the mechanically mixed mixture of said first and second materials from said housing means.

6. In a mixer, in combination, a pair of rotary members comprising a dished member having an outer peripheral portion forming, substantially, part of a cone, and a ring coaxial with said dished member, the interior of said dished member being directed toward said ring and said ring having an annular face directed away from said dished member; feeding means having an inner portion communicating through said ring with said dished member and a separate outer portion out of communication with said inner portion and communicating with said annular face of said ring so that a pair of materials to be mixed may be fed through said portions of said feeding means respectively to the interior of said dished member and to said annular face of said ring without contacting each other; an annular frusto-conical member coaxial with and surrounding said ring and having an inner face directed toward said dished member, said annular frusto-conical member being inclined oppositely to said peripheral portion of said dished member while being spaced therefrom and extending through a substantial distance beyond the same; means connecting said frusto-conical member to said ring for rotary movement therewith while placing said inner face of said frusto-conical member in communication with said annular face of said ring, whereby during rotation of said ring and members about their common axis a first material on said annular face of said ring will fly therefrom by centrifugal force onto said inner face of said frusto-conical member and move along said inner face outwardly beyond the periphery of said dished member, while a second material fed by said inner portion of said feeding means to said dished member will move by centrifugal force from the periphery thereof onto the inner face of said frusto-conical member to mix with the first material while both materials simultaneously move along the portion of said frusto-conical member which extends beyond said dished member toward the outer periphery of said frusto-conical member by centrifugal force; means carried by one of said rotary members for mechanically mixing said mixture of the first and second materials while both materials move along the portion of said frusto-conical member which extends beyond said dished member toward the outer periphery of said frusto-conical member; housing means encompassing said ring and dished member; and means for removing the mechanically mixed mixture of said first and second materials from said housing means.

References Cited in the file of this patent
UNITED STATES PATENTS

| | | |
|---|---|---|
| 737,003 | McKnight | Aug. 25, 1903 |
| 2,441,711 | McFadden | May 18, 1948 |
| 2,502,022 | Paul | Mar. 28, 1950 |
| 2,625,305 | Conkling | Jan. 13, 1953 |
| 2,639,901 | Teale | May 26, 1953 |